United States Patent
d'Alancon (10) Patent No.: US 10,776,782 B2
(45) Date of Patent: Sep. 15, 2020

(54) SYSTEM AND METHOD FOR MAKING AND TRACKING CHARITABLE CONTRIBUTIONS

(71) Applicant: HEOH, Paris (FR)

(72) Inventor: Ghislain Audemard d'Alancon, Paris (FR)

(73) Assignee: HEOH SA, Paris (FR)

( * ) Notice: Subject to any disclaimer, the term of this patent is extended or adjusted under 35 U.S.C. 154(b) by 298 days.

(21) Appl. No.: 14/992,228

(22) Filed: Jan. 11, 2016

(65) Prior Publication Data
US 2016/0125482 A1    May 5, 2016

Related U.S. Application Data (60) Provisional application No. 62/101,649, filed on Jan. 9, 2015.

(30) Foreign Application Priority Data

Sep. 15, 2014  (FR) ...................................... 14 58676

(51) Int. Cl.
*G06Q 20/38* (2012.01)
*G06Q 20/22* (2012.01)
(Continued)

(52) U.S. Cl.
CPC .......... *G06Q 20/38* (2013.01); *G06F 3/0484* (2013.01); *G06Q 20/20* (2013.01); *G06Q 20/209* (2013.01);
(Continued)

(58) Field of Classification Search
CPC ......... G06Q 30/0279; G06Q 20/38215; G06Q 20/209; G06Q 20/20; G06Q 20/22; G06Q 20/38; G06F 3/0484
(Continued)

(56) References Cited

U.S. PATENT DOCUMENTS

| 5,466,919 A | * | 11/1995 | Hovakimian | .......... G06Q 20/10 235/380 |
| 6,088,682 A | * | 7/2000 | Burke | .................... G06Q 20/04 235/375 |

(Continued)

FOREIGN PATENT DOCUMENTS

AU    2007202567 A1 *  6/2007

OTHER PUBLICATIONS

NPL, www.huffingtonpost.com/2013/09/03/checkout-charity, "Donate a Dollar at the Register? Checkout Charity is Big Busines for NonProfits." Sep. 3, 2103.*
(Continued)

*Primary Examiner* — Gerardo Araque, Jr.
*Assistant Examiner* — Debra L Glennie
(74) *Attorney, Agent, or Firm* — Bodi Law LLC (57) ABSTRACT

A system and method for managing composite transactions comprising a main transaction and at least one annex operation in a set comprising a device for initiating a transaction, a device for proposing at least one annex operation according to characteristics of a main transaction and an annex operations management device, said device for proposing at least one annex operation being accessible by a plurality of separate devices for initiating a transaction and by a plurality of separate annex operations management devices.

20 Claims, 4 Drawing Sheets

(51) Int. Cl.
    G06Q 20/20      (2012.01)
    G06F 3/0484     (2013.01)
    G06Q 30/02      (2012.01)
    G06Q 20/40      (2012.01)
(52) U.S. Cl.
    CPC ........... *G06Q 20/22* (2013.01); *G06Q 20/405* (2013.01); *G06Q 30/0279* (2013.01)
(58) Field of Classification Search
    USPC ......................................................... 705/329
    See application file for complete search history.

(56) References Cited

U.S. PATENT DOCUMENTS

| | | | | | |
|---|---|---|---|---|---|
| 6,112,191 | A * | 8/2000 | Burke | .................... | G06Q 20/04 235/375 |
| 6,594,640 | B1 * | 7/2003 | Postrel | .................... | G06Q 20/06 705/14.27 |
| 6,876,971 | B1 * | 4/2005 | Burke | .................... | G06Q 20/04 705/14.1 |
| 7,542,919 | B1 * | 6/2009 | Mueller | ................ | G06Q 10/087 705/16 |
| 8,214,287 | B1 * | 7/2012 | Garfield | ................. | G06Q 20/10 705/35 |
| 8,336,762 | B1 * | 12/2012 | DiMattina | .............. | G06Q 20/20 235/377 |
| 2002/0062173 | A1 * | 5/2002 | Gzybowski | .......... | G04G 15/006 700/232 |
| 2002/0116214 | A1 * | 8/2002 | Horn | ...................... | G06Q 40/02 705/329 |
| 2002/0196204 | A1 * | 12/2002 | Matthew Senn | ....... | A47F 9/046 345/30 |
| 2003/0065572 | A1 * | 4/2003 | McNee | .................. | G06Q 30/02 705/26.1 |
| 2005/0125342 | A1 * | 6/2005 | Schiff | .................... | G06Q 20/10 705/39 |
| 2005/0251485 | A1 * | 11/2005 | Quigley | ................. | G06Q 30/02 705/53 |
| 2006/0122874 | A1 * | 6/2006 | Postrel | ............... | G06Q 30/0232 705/26.1 |
| 2009/0171835 | A1 * | 7/2009 | Blythe | .................. | G06Q 20/10 705/39 |
| 2015/0006426 | A1 * | 1/2015 | Sobhani | ................ | G06Q 20/10 705/329 |

OTHER PUBLICATIONS

Disclosed anonymously, Method and system for using data analytics to leverage consumer purchase patterns to support charity organizations, Sep. 11, 2014. IP.com, IP.com No. IPCOM000238684. pp. 2-4 (Year: 2014).*

* cited by examiner

SYSTEM AND METHOD FOR MAKING AND TRACKING CHARITABLE CONTRIBUTIONS

CROSS-REFERENCES TO RELATED APPLICATIONS

This application claims the benefit of U.S. provisional application Ser. No. 62/101,649 filed on Jan. 9, 2015, which claims the benefit of French Patent application serial number 1458676 filed on Sep. 15, 2014, all incorporated herein by reference.

BACKGROUND

The present disclosure relates to the management of financial transactions made by debtors with creditors via bank accounts of the latter. More precisely, this disclosure relates to methods and devices for managing composite transactions, for example transactions comprising a payment and a donation to a particular entity, done by means of devices connected by a communications network.

Whereas traditionally donations used to be made autonomously, for example by addressing a cheque or a transfer to an entity of general interest or by giving change to a representative of an association, today there are computer applications (that is, in practice, on computers, personal assistants, smartphones or similar).

An important characteristic of the computer-implemented mechanisms for collecting donations relates to the quality of interfaces for making donations so that a user is not inclined to discard an offer for donation due to complexity, excessive time, uncertainty as to amount, beneficiary or reliability of the procedure, etc.

While these mechanisms generally follow simple monetary rules by proposing for example rounding a sum to be paid for a purchase up to a whole number or paying a predetermined sum for each purchase, the implementation is generally complex for meeting the simplicity needs of the user and security needs of transactions. Also, there is substantial demand for traceability of donations, especially for tax reasons.

Figure 1:
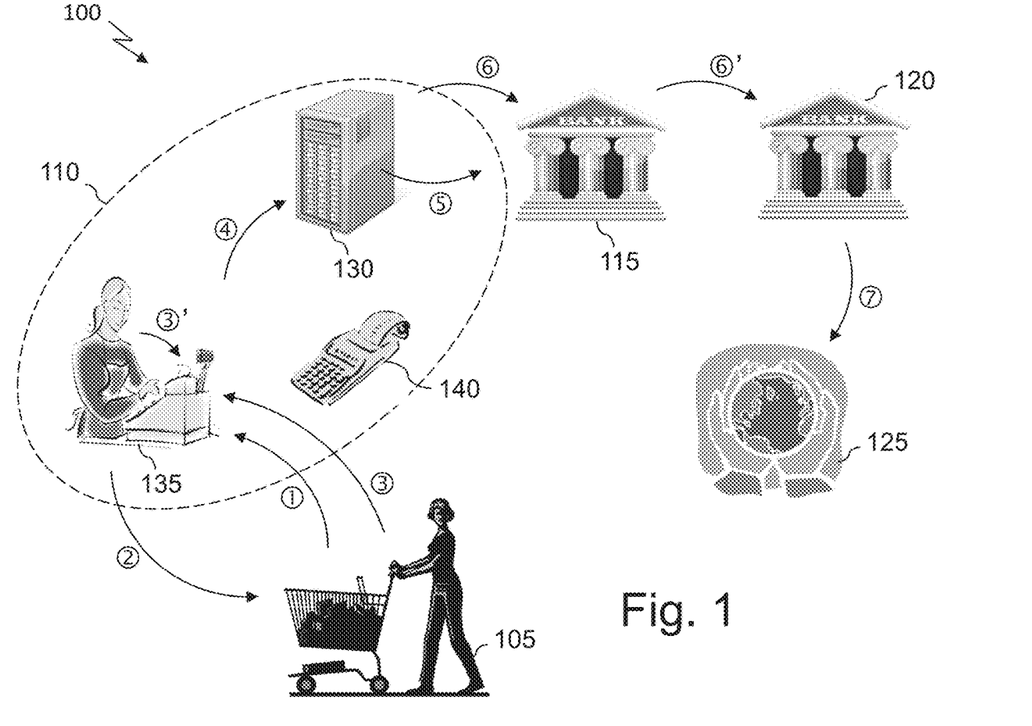
FIG. 1 schematically illustrates an environment in which a mechanism for collecting donations can be implemented, allowing a client to make a micro-donation during purchase, for example a donation of the difference between the price to pay and this price rounded up to a whole number.

FIG. 1 schematically illustrates an environment in which a mechanism for collecting donations can be implemented, allowing a client to make a micro-donation during a purchase, for example a donation of the difference between the price to pay and this price rounded up to a whole number.

As illustrated, the environment 100 allows a client 105 having a payment card making purchases from a merchant having a computer infrastructure 110. Apart from this infrastructure, the environment 100 here comprises a computer system 115 linked to a bank of the merchant, a computer system (not shown) linked to a bank of the client and a computer system 120 linked to a bank of an organisation 125 of NGO type (acronym for Non-Governmental Organisation).

The computer infrastructure 110 of the merchant here comprises, in particular, a computerised accounting system 130, a cash register software 135 associated with a cash register operated by a checkout operator and a payment terminal 140. The computerised accounting system 130 and the cash register software 135 are connected to each other by a communications network, for example a network of Ethernet type using IP protocol (acronym for Internet Protocol). Computer systems linked to banks are connected to each other and to the computerised accounting system 130 as well as to the payment terminal 140 by a communications network of Internet type, with data exchanges being secured, for example by encryption.

The mechanism for collecting donations is generally implemented in the computerised accounting system 130 of the merchant and in the cash register software.

When a client go through checkout to make payment for his purchases (step ①), of an amount noted M, the checkout operator asks if he wants to make a donation of an amount noted D (step ②). If the client declines, the payment process continues conventionally (not shown).

On the contrary, if the client accepts to make a donation (step ③), the checkout operator presses a specific button to calculate a donation value based on the rounded up value of the amount of purchases, scans a specific barcode to obtain a similar result or inputs the amount of the donation using the cash register software (step ③'). This input is typically performed by adding a particular reference to the list of references of products bought by the client, this particular reference designating a donation and allowing, if desirable, inputting any amount by the checkout operator.

It is observed that several particular references can be used to designate an entity to which the donation is to be made. The donation is thus integrated into the sales receipt whereof the total amount indicated, noted T, comprises the amount of real purchases (M) and the amount of the donation (D). In other words, T=M+D.

In a following step (step ④), the total amount (T) indicated on the sales receipt, the amount of real purchases (M) and the amount of the donation (D) are transmitted by the cash register software 135 to the computerised accounting system 130 of the merchant.

If payment of purchases is made by bank card (and not in cash or by cheque), the cash register software automatically transmits the amount to be paid (T) to the payment terminal 140. Alternatively, this amount is input by the checkout operator at the payment terminal 140. If it is authorised, the client validates the payment by means of his secret code.

The computer system of the bank of the merchant telecollects the cashed transactions of the merchant, typically periodically, and through a bank intermediation scheme, presents the amount of the payments (T=M or T=M+D according to whether the client has made a donation or not) to credit an account of the merchant by a corresponding amount (step ⑤).

At the same time, the computerised accounting system 130 of the merchant updates account journals into which the amounts of real purchases (M) and the amounts of donations (D), typically by beneficiary organisation, appear. Separate management of amounts of real purchases (M) and amounts of donations (D) is utilized for accounting reasons (linked for example to VAT, acronym for Value-Added Tax) and tax reasons (especially for calculating revenues in which the amount of donations does not have to be specified).

The account journal of donations is especially used by the merchant to periodically refund, for example every month, the total amount of donations received for the account of one or more organisations. Such payments are typically made upon order of the merchant to its bank, the latter executing the order of transaction (steps ⑥ and ⑥'). The organisation or organisations then have donations paid for carrying out their missions (step ⑦).

It is observed here that implementation of the mechanisms for collecting donations or micro-donations such as that described with reference to FIG. 1 requires substantial modifications of the used devices.

In particular, it is typical to modify the cash register software and/or to add a software cooperating with the latter, to allow the input of at least one particular reference designating a donation and enabling the calculation of an associated amount or the input of any associated amount, so that a particular article, not subject to VAT, is added to a sales receipt.

It is also typical to modify the computerised accounting system of the merchant to allow separate management of amounts of real purchases and amounts of donations, to enable processing of references of products assimilated into donations and not subject to VAT (these amounts do not have to form part of the calculated revenue) to manage different account journals and credit external accounts (accounts associated with organisations of NGO type) as well as to calculate the exact revenue amount.

In addition, it should be noted that the implementation of these mechanisms for collecting donations requires the involvement of checkout personnel for clients. Therefore, for example, checkout operators will beg the clients by asking them to make a donation and if so, handle initiation of the donation management process. This extra work is generally considered as unpleasant by checkout operators who feel that they are begging for donations. Also, this method may have an unpleasant psychological influence and be considered as intrusive by the client who feels trapped to the extent where a refusal can be poorly received by a checkout operator or a nearby customer when the question is asked.

Therefore, the constraints imposed by these mechanisms for collecting donations have considerable consequences.

Also, there is a risk of substantially slowing down the checkout due to the complexity of the procedure.

Finally, the modifications to be made to the cash register software and in the computerised accounting system of the merchant are very expensive (typically of the order of several million euros (dollars) in terms of a chain operating nationally). It is observed here that modifications are very difficult to export from one merchant to another, thereby involving repetition of modification operations and therefore of related costs.

Finally, transfer and management of funds are of the responsibility of the merchant, without real possible controls. The traceability of donations is accordingly not assured, leading to problems such as tax exemption problems.

SUMMARY

At least some of the disclosed embodiments allow solving at least one of the problems outlined previously.

The aim of the example embodiments is a management method of a composite transaction comprising a main transaction and at least one annex operation, this method being implemented in a set comprising a device for initiating a transaction, a device for proposing at least one annex operation according to characteristics of a main transaction and an annex operations management device, said device for proposing at least one annex operation being accessible by a plurality of separate devices for initiating a transaction and by a plurality of separate annex operations management devices, this method comprising the following steps, receiving information relative to said main transaction, said information being received from said device for initiating a transaction by said device for proposing at least one annex operation;

estimating at least one parameter of said at least one annex operation, from at least one predetermined rule, according to at least one received item of information relative to said main transaction, said estimation step being performed in said device for proposing at least one annex operation;

in response to an indication of acceptance of said at least one annex operation received from said device for initiating a transaction, transmitting to said annex operations management device data comprising at least said at least one parameter of said at least one annex operation, said main transaction being managed independently of said steps of receiving, estimating and transmitting.

The method according to at least some of the embodiments offers the possibility of making donations during payment at a payment terminal without substantial modification of the cash register software and of the computer accounting systems of merchants. The costs of computer setup at merchants are therefore not significant (the same device for proposing at least one annex operation or the same management system for donation requests can be used by different merchant systems, different bank systems and/or different donation beneficiary systems).

Collecting donations is particularly rapid because of a number of operations which can be limited to a single input of acceptance type. Also, checkout operators are not being asked to collect donations.

The method for management of donations according to the at least some of the example embodiments enables simplified installation in a large number of merchants as well as control and traceability of donations.

According to a particular embodiment, the method further comprises a step of selecting said at least one rule for estimating said at least one parameter of said at least one annex operation.

According to a particular embodiment, the method further comprises a step of receiving an identifier of said device for initiating a transaction, said at least one rule for estimating said at least one parameter of said at least one annex operation being selected according to said identifier of said device for initiating a transaction.

According to a particular embodiment, the method further comprises an initial configuration step of at least one rule for estimating at least one parameter of at least one annex operation.

According to a particular embodiment, said data transmitted to said annex operations management device in response to an indication of acceptance of said at least one annex operation further comprise said information relative to said main transaction.

According to a particular embodiment, the method further comprises a step of transmitting a print command to said device for initiating a transaction, said print command aiming at printing a receipt comprising said at least one parameter of said at least one annex operation and said at least one received item of information.

A client can keep evidence of a donation made by way of printing a receipt at a payment terminal, which contains a reference. The latter allows identification of the user on a computer management system for donations especially for accessing a set of donations already made and downloading tax receipts.

According to a particular embodiment, said print command also aims at printing a reference to an identifier of a personal entity on said receipt.

According to a particular embodiment, said data comprising at least said at least one parameter of said at least one annex operation further comprise said reference.

According to a particular embodiment, the method further comprises a step of storing said at least one parameter of said at least one annex operation.

According to a particular embodiment, the method further comprises a step of generating a transaction based on at least one previously stored parameter of at least one annex operation.

According to a particular embodiment, the method further comprises a step of generating a summary of annex operations, said summary comprising at least one previously stored parameter of at least one annex operation.

According to a particular embodiment, the method further comprises a step of encrypting at least one datum transmitted between said device for initiating a transaction and said device for proposing at least one annex operation or between said device for proposing at least one annex operation and said annex operations management device.

According to a particular embodiment, the communication protocol between said device for initiating a transaction and said device for proposing at least one annex operation or between said device for proposing at least one annex operation and said annex operations management device complies with a standard of the IP type.

At least some of the example embodiments also concerns a computer program comprising instructions adapted to carrying out each of the steps of the method described previously when said program is executed on a computer as well as a system comprising means adapted to carrying out each of the steps of the method described previously. The advantages provided by this computer program and this system are similar to those mentioned hereinabove.

BRIEF DESCRIPTION OF THE DRAWINGS

Other advantages, aims and characteristics of the example embodiments will emerge from the following detailed description, given by way of non-limiting example, with respect to the appended drawings, in which.

DETAILED DESCRIPTION OF THE EXAMPLE EMBODIMENTS

According to at least some of the example embodiments, a management mechanism of composite transactions computer-implemented, for example a mechanism for collecting donations, calls on several devices including a set of third-party devices in order to isolate at least partially specific elements of the management of composite transactions.

A composite transaction here comprises a main transaction and at least one annex operation. The latter typically concerns amounts and beneficiaries different from those of the main transaction. It is recalled that a transaction is a commercial operation aiming, for the party forming the subject of a particular embodiment, at a transfer of a monetary sum between a debtor and a creditor.

By way of illustration, a composite transaction can comprise a payment of a purchase (main transaction) combined with a donation (annex operation).

According to a particular embodiment, the management of donations is entrusted to two separate servers, one handling the management of donation requests, called computer management system for donation requests or more and generally device for proposing at least one annex operation, and the other the management of the donations themselves, called computer management system for donations or more and generally annex operations management device.

Figure 2:
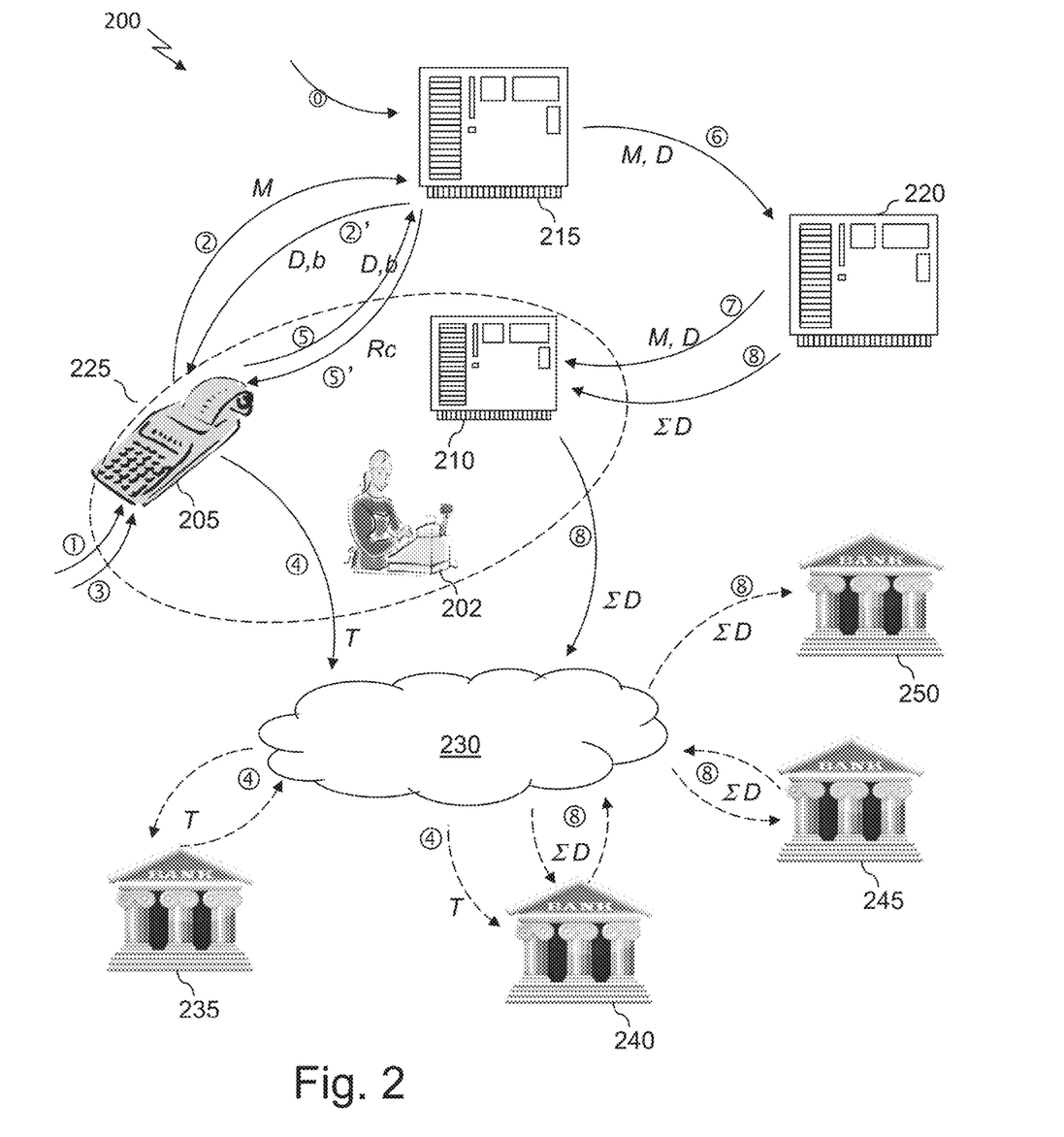
FIG. 2 schematically illustrates an environment in which a particular example embodiment, as well as some steps of an exemplary method, may be implemented.

FIG. 2 schematically illustrates an environment in which a particular embodiment, as well as some steps of an exemplary method can be implemented.

The environment 200 here comprises a merchant computer system 225 including a cash register software 202, a payment terminal 205 (more generally called a device for initiating a transaction that provides a user interface for a user who may be a customer of the merchant), and a computerised accounting system 210. The environment 200 also comprises an annex operation computer system comprising a computer management system for donation requests 215 and a computer management system for donations 220. As illustrated, the cash register software 202, the payment terminal 205 and the computerised accounting system 210 belong to the merchant operating the merchant computer system 225.

The cash register software 202 and the payment terminal 205 as well as the cash register software 202 and the computerised accounting system 210 are connected by a private or public communications network, for example an Ethernet network or the Internet network.

The payment terminal 205 is here also connected to the computer management system for donation requests 215, for example an Ethernet network or the Internet network, allowing an exchange of data in real time.

The computer management system for donation requests 215 and the computer management system for donations 220 are here accessible via a public communications network, for example the Internet network, in order to be accessible by computer systems of different merchants and different users (i.e. clients).

The communication protocols between these different devices are preferably selected from among standard protocols, for example IP and X.25 protocols.

It is observed that if the computer management system for donation requests 215 and the computer management system for donations 220 comprising the annex operation computer system are typically separate servers, the management of donation requests and management of donations can be undertaken by two applications implemented on the same server, or even by the same application.

The environment 200 further comprises a bank intermediation network 230, for example the bank intermediation network of MasterCard, Visa, GIE Carte Bancaire, SWIFT, STET or Target 2 (MasterCard, Visa, GIE Carte Bancaire, SWIFT, STET and Target 2 are trademarks), as well as computer systems for management of bank accounts 235 to 250 associated respectively with a client, with the merchant having the cash register software 202, the payment terminal 205 and the computerised accounting system 210, with a third party in charge of managing donations and with a donation beneficiary organisation.

According to a particular embodiment, the data exchanged between the cash register software 202, the payment terminal 205, the computerised accounting system 210, the computer management system for donation requests 215, the computer management system for donations 220, the bank intermediation network 230 and the computer systems for management of bank accounts and transactions 235 to 250 are transmitted in the form of messages encrypted by means of standard algorithms, for example algorithms based on the use of private keys and public keys, notably algorithms of RSA type (i.e. Ronald Rivest, Adi Shamir and Leonard Adleman), by packets. Alternatively, only some exchanges are encrypted according to their nature and/or according to the source and/or destination devices.

As shown in FIG. 2, the aim of an initial step (step ⓪) is to configure the computer management system for donation requests 215. Such configuration comprises especially the definition of one or more rules associated with one or more payment terminals, typically all the payment terminals of the same merchant, defining a modality for calculating an amount of donations and associating a donation with a recipient, for example an organisation of NGO type.

These rules are typically applied according to received parameters, for example according to a received value (e.g. amount of a transaction), and/or an identifier of the device from which these data are received (i.e. sender of the message comprising these data).

An example of such rules is illustrated the attached table 1. As illustrated, each line of the table corresponds to a rule. Each rule is here defined by an identifier (column 1), an identifier of a payment terminal or a group of payment terminals (column 2), a method for calculating donations (column 3) and an identifier of a beneficiary or a group of beneficiaries (column 4).

TABLE 1

| ID rule | ID TPE | RULE | ID beneficiaries |
| --- | --- | --- | --- |
| 0 | 543291 | Rounded up | 1 |
| 1 | 1294G3 | Fixed price of 1€ per transaction | 1 (0.40€), 3 (0.60€) |
| 2 | G53391 | Minimum between 0.5% of the transaction and 5€ | 1 (50%), 2 (50%) |
| ... | ... | ... | ... |
| n | 491503 | Rounded up | 1 |

Of course, other information can be used in the definition of rules.

When a group of beneficiaries is designated, the distribution of a donation between the latter can be predetermined or left to the appreciation of a user (can especially select a sole beneficiary in the group).

Thus, for example, the rule having the identifier 2 applies to the payment terminal or group of payment terminals having the identifier G53391, the beneficiaries being for a first half of a donation a beneficiary having the identifier 1 and for the second half of the donation a beneficiary having the identifier 2. The amount of the donation is determined here as a function of the amount of purchases (0.5%) or on a flat-rate basis (5 €), the lesser value being retained.

The setting of these rules may be done via a protected access to the computer management system for donation requests 215. By way of illustration, a merchant can access, by means of an identifier of a payment terminal or a group of payment terminals and of a password, to all the rules associated with this identifier, i.e. to a subset of stored rules. Access to rules allows adding, modifying or deleting rules. Access can be done from any computer (or equivalent) connected to the computer management system for donation requests 215 via a communications network such as the Internet and via a portal of web type.

When a client user is in front of a payment terminal to pay for the main transaction including purchases, and after the amount M of purchases has been determined, for example by a checkout operator or automatically and obtained by the payment terminal (step ①), manually or automatically, a communications link or a communications session is set up between the payment terminal 205 and the computer management system for donation requests 215.

According to a particular embodiment, the communications link is set up automatically after input, obtaining or validation of the amount M of purchases. For this purpose, the payment terminal comprises an address of the computer management system for donation requests 215, for example a URL link (acronym for Uniform Resource Locator) associated with an access command called up as soon as an amount is input, obtained or validated.

As described previously, the computer management system for donation requests 215 can be accessed from different payment terminals managed by different merchants, i.e. by different payment terminals having no links between them.

Following setting up the communications link between the payment terminal 205 and the computer management system for donation requests 215, transaction information such as the amount M of purchases and an identifier of the payment terminal and of the transaction are transmitted by the payment terminal 205 to the computer management system for donation requests 215 (step ②).

Alternatively, the amount M of purchases as well as the identifier of the payment terminal are transmitted in the form of a message to a predetermined address or to an address determined dynamically, for example by means of a mechanism of DNS type (acronym for Domain Name System).

In response, the computer management system for donation requests 215 determines the applicable rule or rules for calculating donations, notably as a function of the identifier received from the payment terminal, and calculates one or more donation values. This value or these values are then transmitted to the payment terminal, each value being associated with a beneficiary denoted b (step ②′).

The value or values of donations as well as the corresponding beneficiaries are preferably displayed on a screen of the payment terminal to let the client validate a donation proposition, select and validate one donation proposition from among several, freely input a donation amount or pay for the purchases without making a donation.

Advantageously, selection or refusal of a donation is done by a single press on a key of the payment terminal (or of a device connected to the latter).

It is observed here that at least some of the actions conducted by a payment terminal can be deported, for example in a device of smartphone type or a web site, to let a user view and/or validate choices on his own device.

Figure 3:
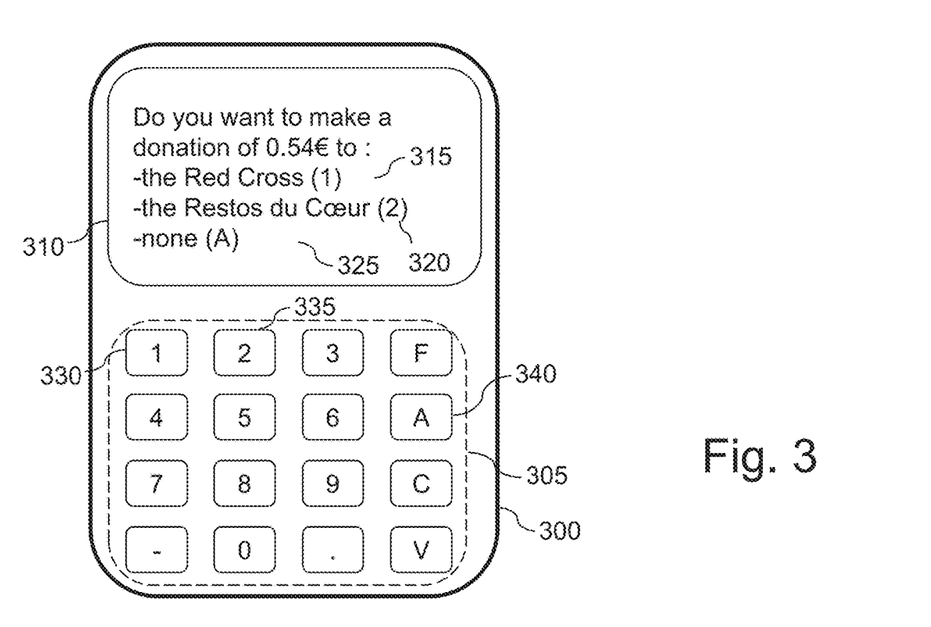
FIG. 3 schematically illustrates a payment terminal element comprising a screen on which several choices of donations are proposed to a user.

FIG. 3 schematically illustrates a payment terminal element comprising a screen on which several choices of donations are proposed to a user. The payment terminal element 300 here comprises a set 305 of keys touches and a screen 310.

As shown, the screen displays a message offering a user the possibility of making a donation of 0.54 € to the Red Cross or to the Restos du Cœur (the Red Cross and the Restos du Cœur are trademarks) or of paying for his purchases without making a donation. As indicated by reference numerals 315, 320 and 325, respectively, pressure on the key 1, referenced 330, effects payment of a donation of 0.54 € to the Red Cross, pressure on the key 2, referenced 335, effects payment of a donation of 0.54 € to the Restos du Cœur and pressure on the key A, referenced 340, effects payment for purchases without making a donation.

After having validated or refused a donation, the user validates his purchases (step ③) for a total amount T corresponding to the amount of his purchases to which is added the amount of the donation (T=M+D) or corresponding only to the amount of purchases (T=M). Typically, when payment of purchases is made by means of a portable electronic entity such as a bank card, validation of purchases is completed by input of a confidential code associated with the used card or by any other biotechnical means (e.g. digital fingerprints). Alternatively, for example if the payment is made by transfer or by means of an electronic wallet, the confidential code can be a code associated with an identifier previously obtained from the user.

Figure 4:
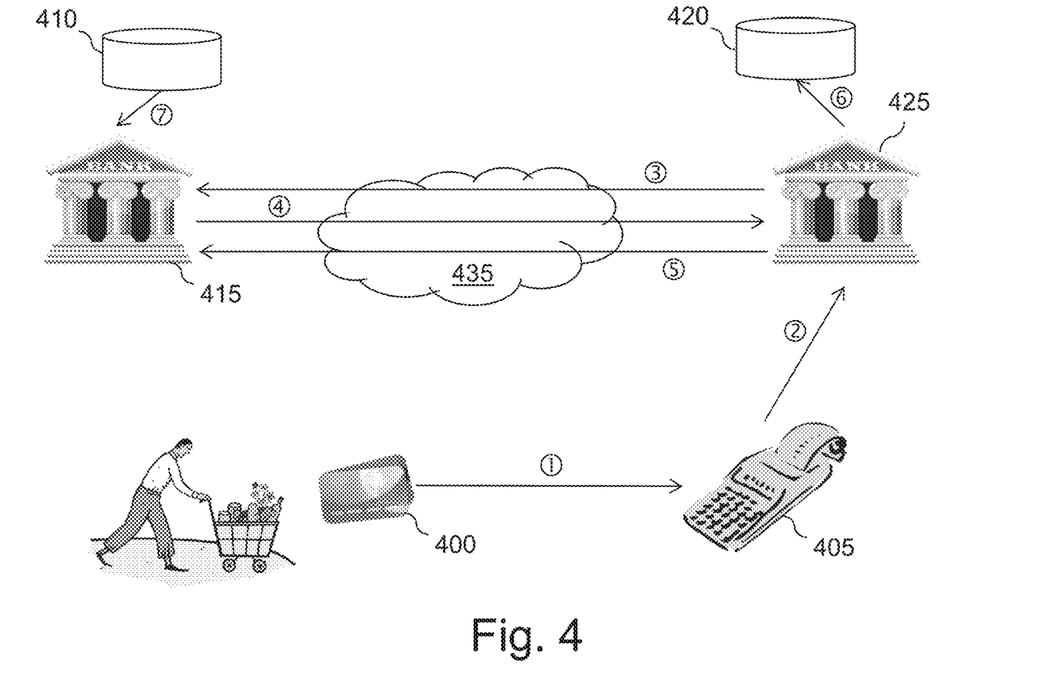
FIG. 4 schematically illustrates a standard payment example by payment card in an infrastructure comprising a payment card, a payment terminal as well as banking computer systems linked to the debtor and creditor.

Taking out the amount T from the bank account of the user and crediting an equivalent amount to the bank account of the merchant is advantageously carried out conventionally as described in reference to FIG. 4 (step ④).

At the same time as payment or, preferably, following receipt of payment authorisation, the payment terminal 205 sends, where desirable, an indication of acceptance of donation to the computer management system for donation requests 215, typically in the form of a message comprising the value or values of the donation and the selected beneficiary or beneficiaries (step ⑤).

In response, the computer management system for donation requests 215 preferably returns a print command for a receipt containing the detail of the operation, that is, the total payment made and its distribution between payment of purchases and donation made (step ⑤'). On receipt of this command, the payment terminal prints this receipt which is given to the user.

According to a particular embodiment, the print command of a receipt is transmitted with a card reference (Rc) associated with the payment card used, this card reference preferably being determined by the payment terminal from an identifier or a card number (for example by applying a hash function to the card number).

It is observed here that, according to a particular embodiment, a personal identifier (IDp) is given to each user during signup on the computer management system for donations 220 (signup comprising typically creating a user profile). The card reference supplied on the receipt can be used for this signup which can be completed, for example, via a web interface. To prevent fraud, creating a profile can be subject to providing additional information, for example, apart from providing the card reference, the user can be requested to give the last six digits of the payment card number (from which a card reference could be generated which will be compared to that received for validation).

A password is advantageously linked to the personal identifier to secure access to data relative to this donor.

When a donor signs up on the computer management system for donations 220, a profile is created. It comprises especially the card reference, and other payment card references which can be associated with this profile.

In addition to access to his profile, the personal identifier lets a donor connect to the computer management system for donations 220, for example via a web page, and get information relative to the history of donations made, download the tax receipts for the cumulative amounts of donations on all his cards or receive information originating from associations benefiting from his generosity.

The personal identifiers and the associated profile are preferably known only for the computer management system for donations 220 (i.e., they are not known by the payment terminal 205 or by the computer management system for donation requests 215).

To allow the computer management system for donations 220 to manage donations, the payment terminal sends the computer management system for donation requests 215 a reference of the payment card used with indication of acceptance of donation. With this card reference, the computer management system for donations 220 can retrieve a personal identifier previously created (the computer management system for donations 220 stores the links between a personal identifier and one or more card references, for example in a table). If no personal identifier is found, the data relative to the donation are stored to be processed later, after creation of a user profile associated with the corresponding card reference.

Following acceptance of a donation, the computer management system for donation requests 215 stores the amount of purchases M as well as the amount of the donation D made in a donations journal. For each transaction completed, the latter comprises a transaction reference, an identifier from a payment terminal or group of payment terminals payment card, a reference Rc, an amount M of purchases, an amount of donation(s) made and the associated beneficiary or beneficiaries (given that the amount of a donation can be distributed among several beneficiaries).

An example of a donations journal of a computer management system for donation requests is illustrated in the attached table 2. By way of illustration, the line of the journal specifying the transaction identified by reference 2 corresponds to a transaction completed from a payment terminal or group of payment terminals identified by reference G53391 for the donor having used a card having reference 023, the amount of purchases made being 87.45 € and the amount of the donation 0.44 € being distributed in equal parts among the beneficiaries identified by references 1 and 2.

TABLE 2

| ID trans. | ID TPE | Rc | M | D, b |
|---|---|---|---|---|
| 0 | 543291 | 407 | 425.66€ | 1: 0.34€ |
| 1 | 543291 | 212 | 35.14€ | 1: 0.86€ |
| 2 | G53391 | 023 | 87.45€ | 1: 0.22€, 2: 0.22€ |
| ... | ... | ... | ... | ... |
| p | 1294G3 | 865 | 118.00€ | 1: 0.40€, 3: 0.60€ |

In addition to a transaction identifier, an identifier from a payment terminal or a group of payment terminals, a payment card reference Rc, an amount M of purchases, an amount of donation(s) made and the associated beneficiary or beneficiaries, the donations journal can optionally (not shown) comprise the amount T of the payment, representing the total amount M of purchases and amount of donation(s) made and paid.

The donations journal is sent periodically, for example every hour or every night, to the computer management system for donations 220 (step ⑥) where it is stored. After transmission to the computer management system for donations, the donations journal stored in the computer management system for donations 220 is reinitialised (however, a copy is preferably kept).

The computer management system for donations 220 then analyses the donations journal to extract those parts concerning a particular computerised accounting system, for example the computerised accounting system 210, that is, the computerised accounting system associated with a payment terminal or a group of payment terminals. The parts extracted concerning a particular computerised accounting system are here transmitted to the latter to allow it to carry out accounting reconciliation (step ⑦).

Periodically, for example every week or every month, the computer management system for donations 220 calculates, for a particular computerised accounting system, the sum of donations made by clients at payment terminals linked to the latter, denoted $\Sigma D$. This calculation is made from the purchase journal by totalling those donations associated with the same payment terminal or the same group of payment terminals. A request for debiting or payment of this amount is sent to this computerised accounting system to credit this amount from a bank account associated with the computer management system for donations (step ⑧).

The debiting or payment of this sum of donations from a bank account associated with a computerised accounting system and crediting an equivalent amount from the bank account associated with the computer management system for donations is advantageously conducted conventionally similarly to a payment method of a supplier.

In a following step, the computer management system for donations 220 calculates for each beneficiary the sum of donations to be reversed. Again, this calculation is effected from the donations journal, accumulating the donations associated with the same beneficiary.

The donations journal stored in the computer management system for donations 220 is preferably updated following transfer of donations. But, a history is kept to enable traceability of donations and setting up tax slips where desirable.

Thus, for example, the computer management system for donations 220 calculates for a particular user, for some or for all users, the sum of donations paid during a given period, typically a fiscal year. Again, this calculation is effected from the donations journal, by accumulating the donations associated with the same user.

The management of composite transactions and in particular donations backed by purchases requires creation of third-party computer systems which can be used by merchants and clients, as well as the development of particular interfaces giving access to these computer systems.

Thus, for example, executing the solution described in reference to FIG. 2 requires setting up a computer management system for donation requests and a computer management system for donations as well as creating interfaces. Of the latter and to execute the solution described in reference to FIG. 2, the following interfaces are set up:

secure data exchange interface, in real time, between software of a payment terminal and software of the computer management system for donation requests;

secure data exchange interface between software of the computer management system for donation requests and software of the computer management system for donations, parameterising interface of the computer management system for donation requests (typically by means of a merchant computer system for configuring rules of donation requests via a web page);

query interface of the computer management system for donations (typically by means of a user computer system for parameterising his identity, registering his cards, modifying his profile and/or accessing donation slips via a web page); and a standard exchange interface between the donations management system and the computerised accounting system of the merchant.

According to a particular embodiment, data exchange interfaces are based on the usual communication protocols and utilise standard encryption algorithms. Therefore, by way of illustration, when computer systems are connected to each other via a network of Internet type, these exchanges can use the IP protocol combined with data encryption by private keys and public keys of RSA type.

FIG. 4 schematically illustrates a standard example of payment by payment card in an infrastructure comprising a payment card, a payment terminal as well as banking computer systems linked to the debtor and the creditor. Such a payment plan is also known under the name of payment model by bank card everywhere.

This payment plan or a similar plan can especially be used for money transfers between an account of a card carrier and an account of a merchant, as specified in reference to FIG. 2.

This payment plan can be used, as for classic plans used for cheques, transfers and debiting, for money transfers between the accounts of a merchant (referenced 240 in FIG. 2), a donations manager (reference 245 on the FIG. 2) and a beneficiary association (referenced 250 in FIG. 2).

As illustrated, a client provided with a payment card 400, for example a card of Visa type (Visa is a trademark), here settles a purchase from a merchant using a payment terminal 405. The payment card is associated with a bank account 410 (client account) managed by a computer system 415 of a bank (typically the bank which issued the bank card or for the account from which the bank card has been issued). In the same way, the payment terminal 405 is associated with a bank account 420 (merchant account) managed by a computer system 425 of a bank.

To make a purchase transaction, a client presents his payment card to merchant a payment terminal to which the amount has been sent manually or automatically (step ①). After validation of the purchase by the client, for example by inputting a confidential code or PIN code (acronym for Personal Identification Number), the payment terminal typically makes an authorisation request which is transmitted to the computer system 415 of the bank of the card carrier via the computer system 425 of the bank of the merchant and a bank intermediation network 435 (step ② and ③).

The message is advantageously encrypted and comprises the identifiers of the client and of the merchant as well as the amount to be transferred.

After authentication and verification, especially of the identity of the client and that of the merchant as well as of the balance of the debtor account, a transfer acceptance message, preferably encrypted, is sent by the computer system 415 of the bank of the client to the computer system 425 of the bank of the merchant (step ④).

After having received a transfer acceptance message, a credit message is sent by the computer system of the bank of the merchant to the address of the computer system of the bank managing the bank account with which the payment card being used is associated (step ⑤), here the computer system 415, via the bank intermediation network 435. This message is preferably encrypted.

It is observed here that requests from bank intermediations can be accumulated and performed later on (as specified previously, the bank intermediation network 435 can be for example the bank intermediation network of MasterCard, Visa, GIE Carte Bancaire, SWIFT, STET or Target 2 (MasterCard, Visa, GIE Carte Bancaire, SWIFT, STET and Target 2 are trademarks).

The merchant account 420 is credited with the sum transferred (step ⑥) while the account 410 of the client is debited by the same sum (step ⑦), typically on a deferred way.

Encryption used for exchanges of data is for example encryption using a public key and a private key, for example encryption of RSA type.

Figure 5:
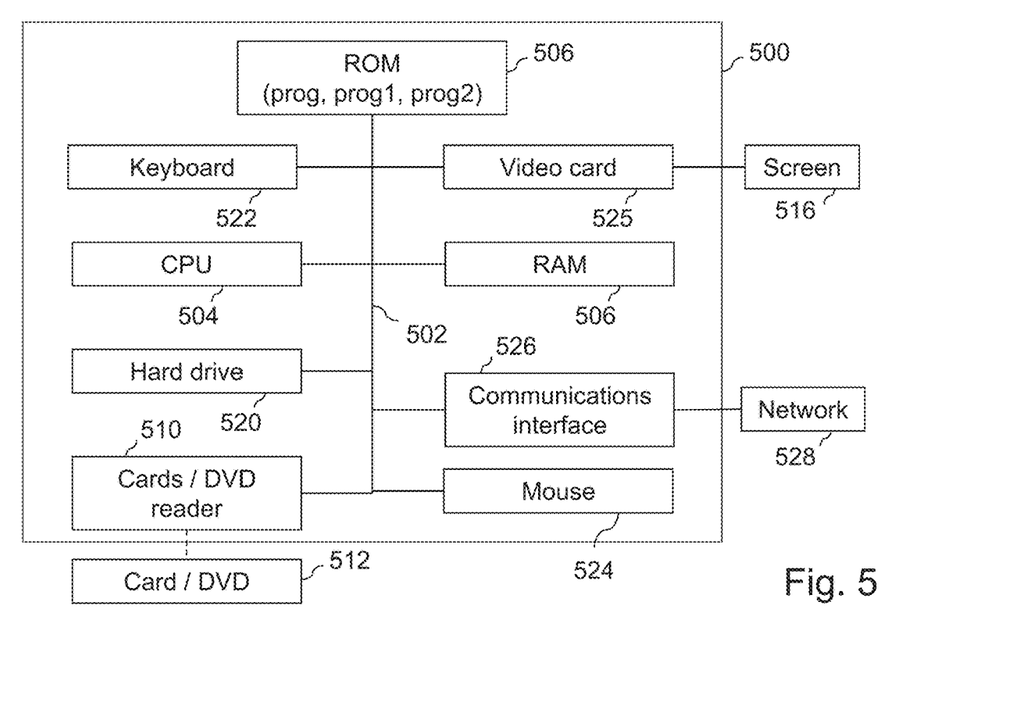
FIG. 5 illustrates an example of an information-processing device adapted to implement, at least partially, an example embodiment.

FIG. 5 illustrates an example of a device which can be used to at least partially implement an embodiment, especially the steps described in reference to FIGS. 2 and 4. The device 500 is for example a server, a computer or a personal assistant.

The device 500 preferably comprises a communications bus 502 to which the following are connected:

a central processing unit or microprocessor 504 (CPU);

a read-only memory 506 (ROM) that may comprise the operating system and programs such as "Prog";

a random access memory or memory cache 508 (RAM) comprising registers adapted to record variables and parameters created and modified during implementation of the abovementioned programs;

a removable support reader 510 of storage 512 such as a memory card or a disc, for example a DVD disc; and a graphics card 514 connected to a screen 516.

Optionally, the device 500 may also comprise the following elements:

a hard drive 520 that may comprise the abovementioned "Prog" programs and data processed or to be processed;

a keyboard 522 and a mouse 524 or any other pointing device such as an optical pen, a touch screen or a remote control allowing the user to interact with the programs, in particular for initiating a money transfer, configuring rules for donation requests, following one or more donation lists and obtaining a tax receipt; and a communications interface 526 connected to a distributed communications network 528, for example the Internet network, the interface being capable of transmitting and receiving data.

The communication bus allows communication and interoperability between the different elements included in the device 500 or connected to it. The representation of the bus is not restrictive and, notably, the central unit is likely to communicate instructions to any element of the device 500 directly or by means of another element of the device 500.

The executable code of each program enabling the programmable apparatus to implement the example method(s) can be stored, for example, on the hard drive 520 or in read-only memory 506.

According to a variant, the executable code of programs could be received by means of the communications network 528, via the interface 526, to be stored identically to that described previously.

More generally, the program or the programs could be loaded into one of the storage means of the device 500 before being executed.

The central unit 504 will control and direct execution of the instructions or portions of software code of the program or programs, instructions which are stored on the hard drive 520 or in the read-only memory 506 or else in the other abovementioned storage elements. During powering up, the program or programs which are stored in non-volatile memory, for example the hard drive 520 or the read-only memory 506, are transferred to the main memory 508 which contains the executable code of the program or programs, as well as registers for storing the variables and parameters desirable to carry out the example embodiments.

As will be appreciated by one of skill in the art, the example embodiments described herein, among others, may be actualized as, or may generally utilize, a method, system, computer program product, or a combination of the foregoing. Accordingly, any of the computer devices of the example embodiments may take the form of an entirely hardware embodiment, an entirely software embodiment (including firmware, resident software, microcode, etc.) for execution on hardware, or an embodiment combining software and hardware aspects that may generally be referred to as a "system." Generally, the "system" will comprise a server with storage capability such as one or more databases that interact with a plurality of remote devices via a communication network such as the Internet, an intranet, or another communication network such as a cellular network, for example. Such networks may utilize Ethernet, WiFi. Bluetooth©, POTS (i.e., Plain Old Telephone Service), cellular, combinations thereof, or other network hardware. Remote devices may include any of a plurality of computing devices, such as smart phones, phablets, tablets, computerized registers, card readers, or personal computers, for example. The remote devices will typically execute software, and in the example embodiments this may include specialized software and/or plug ins to perform the functions described herein.

Furthermore, any of the embodiments may take the form of a computer program product on a computer-usable storage medium having computer-usable program code embodied in the medium, in particular the functions executing on the server system which may include one or more computer servers and one or more databases, such as, for example, described hereinbelow.

Any suitable computer usable (computer readable) medium may be utilized for storing the software to be executed for implementing the method. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CDROM), cloud storage (remote storage, perhaps as a service), or other tangible optical or magnetic storage device; or transmission media such as those supporting the Internet or an intranet.

Computer program code for carrying out operations of the example embodiments (e.g., for the aps or server software) may be written by conventional means using any computer language, including but not limited to, an interpreted or event driven language such as BASIC, Lisp, VBA™, or VBScript™, or a GUI embodiment such as visual basic, a compiled programming language such as FORTRAN, COBOL, or Pascal, an object oriented, scripted or unscripted programming language such as Java©, JavaScript©, Perl©, Smalltalk©, C++, Object Pascal, or the like, artificial intelligence languages such as Prolog©, a real-time embedded language such as Ada, or even more direct or simplified programming using ladder logic, an Assembler language, or directly programming using an appropriate machine language. Web-based languages such as HTML or any of its many variants may be utilized. Graphical objects may be stored using any graphical storage or compression format, such as bitmap, vector, metafile, scene, animation, multimedia, hypertext and hypermedia, VRML (i.e., Virtual Reality Modeling Language), and other formats could be used. Editing and development tools for any of these languages and/or formats can be used to create the software.

The computer program data and instructions of the software and/or scripts may be provided to a remote computing device (e.g., a smartphone, tablet, phablet, PC, card readers, cash registers, or other device) which includes one or more programmable processors or controllers, or other programmable data processing apparatus, which executes the instructions via the processor of the computer or other programmable data processing apparatus for implementing the functions/acts specified in this document. It should also be noted that, in some alternative implementations, the functions may occur out of the order noted herein. In particular, the disclosed embodiments may utilize installed operating systems running specialized software for providing the desired user interfaces for interacting with the users using the remote devices.

Figure 6:
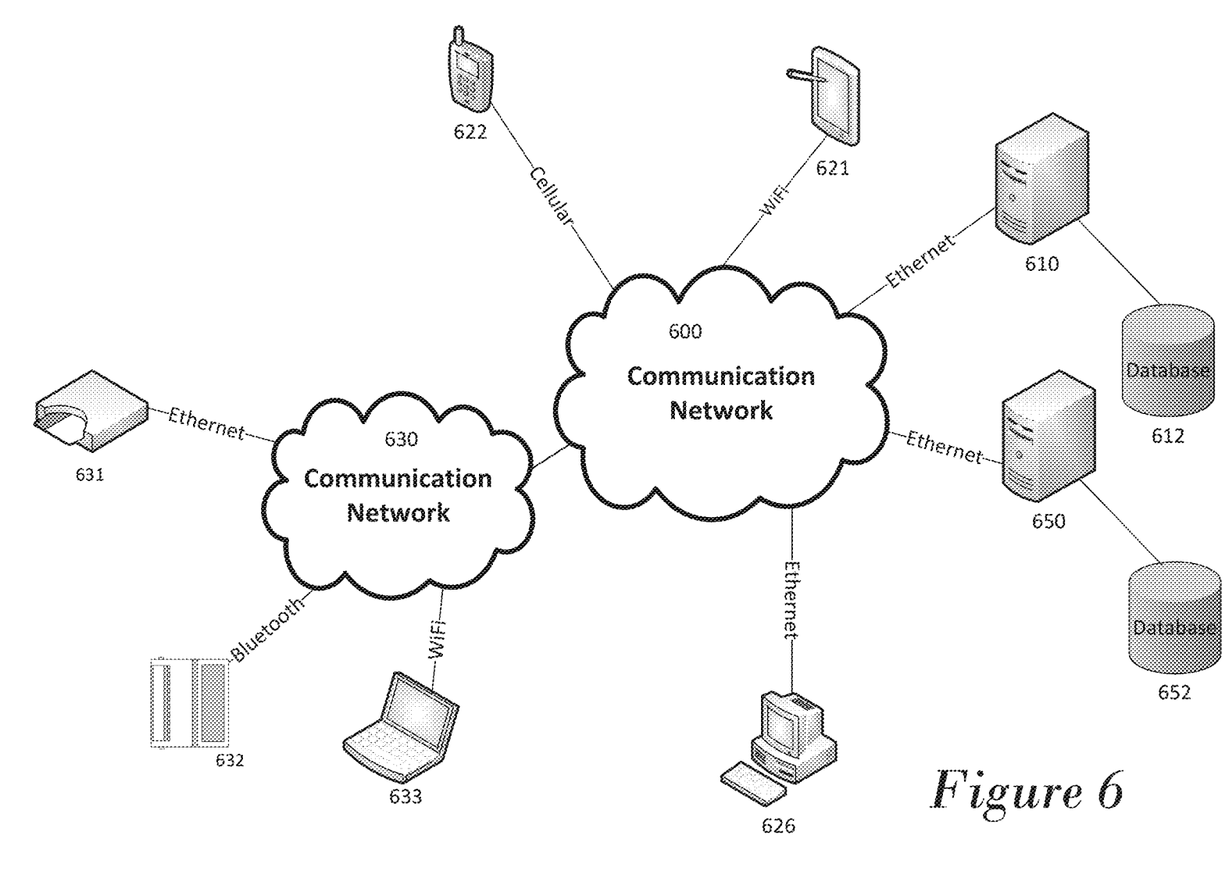
FIG. 6 illustrates an example networked hardware system that may be utilized for practicing at least some of the example embodiments.

FIG. 6 shows an example of various hardware networked together that could be used for implementing an example environment 200 (FIG. 2) to practice one or more of the example embodiments described herein. A server 610 connected to one or more databases 612 for storing the various software applications and data used by the system, such as one that might be utilized for implementing a computer management system for donations (e.g., device 500 as shown in FIG. 5). The server 610, which may comprise one or more computer servers and/or other computing devices, can be connected to a communication network 600 (such as the Internet), possibly via an internal network (e.g., an intranet) for generating the data for transmittal to various external devices 621, 622, 626 as desired. Additional external systems (such as payment processors, among others) may user a server 650 with database 652, also connected to the communication network 600. Any of the servers may include an a web server located in the "cloud", and it will likely be accessible to the remote computing devices via the communication network 600, which may include the Internet, cellular networks, WiFi networks, and Bluetooth networks, among others. The external devices may include, among others, tablets, smartphones, cell phones, laptops, and personal computers, among others, any of which may connect to the server 610 via the communication network 600 (e.g., the Internet) via various means described herein.

Various vendor/retailers can have various external equipment, such as computer terminals 633, cash registers 632, and/or credit card readers 631 connected to a local communication network 630 that communicates with the server 610 via the communication network 600, for implementing any of the disclosed embodiments, as desired.

Naturally, to satisfy specific needs, a person skilled in the pertinent arts may apply modifications to the preceding description. The present disclosure is not limited to the embodiments described, and other variants and combinations of characteristics are possible.

The example embodiments have been described and illustrated in the present detailed description in reference to the attached figures. However, possible related embodiments are not limited to the embodiments presented herein. Other variants and embodiments can be deduced and executed by the person competent in the pertinent field on reading the present description and attached figures.

In the claims, the term "comprise" does not exclude other elements or other steps. The indefinite article "a" does not exclude the plural. A single processor or several other units can be used to execute at least some the example embodiments. The different characteristics presented and/or claimed can be combined advantageously. Their presence in the description or in different dependent claims does not in fact exclude the possibility of combining them. The reference signs cannot be understood as limiting the scope of the disclosure.

What is claimed is:

1. A method for management of a composite transaction using a merchant computer system that includes a user interface device at a merchant location connected to the merchant computer system via a computer network, and an annex operation computer management system located remotely from the merchant location, with the systems communicating with each other over a communication network, said method for providing donations to any of a plurality of different organizations, said method comprising the steps of:

the merchant computer system executing software instructions conducting a main transaction at the merchant location using the user interface device in support of transacting business with a merchant;

the merchant computer system executing software instructions establishing a communication interface with the annex operation computer management system over the communication network;

the merchant computer system executing software instructions sending transaction information relative to the main transaction over the communication network to the annex operation computer management system;

in response to receiving the transaction information, executing software instructions on the annex operation computer management system automatically calculating at least one parameter of a proposed annex operation from at least one predetermined rule related to a donation request, said calculating step being performed according to at least one received item of information in said received transaction information;

executing software instructions on the annex operation computer management system sending information regarding the calculated at least one parameter to the merchant computer system;

contemporaneous with conducting the main transaction, executing software instructions on the merchant computer system proposing to a user using the user interface device at least one annex transaction regarding a donation based on the information regarding the calculated at least one parameter, wherein said user interface device is configured to receive an acceptance or refusal of the proposed at least one annex operation regarding the donation from the user;

in response to the user interface device receiving an acceptance of the proposed at least one annex operation, the merchant computer system executing software instructions notifying the annex operation computer management system of said acceptance;

in response to receiving the acceptance, said annex operation computer management system executing software instructions utilizing the calculated at least one parameter to document said annex transaction regarding the donation;

in response to receiving an acceptance of the proposed at least one annex operation from the user, said annex operation computer management system executing software instructions utilizing the documented annex transaction regarding the donation to transmit payment instructions including information about the documented annex transaction regarding the donation to said merchant computer system to provide payment of a donation to a recipient;

in response to receiving said payment instructions from said annex operation computer management system, said merchant computer system executing software instructions to send banking transaction information to a banking computer system that is separate and located remotely from the annex operation computer management system, said payment instructions instructing payment of the donation to the recipient based on the based on the information about the documented annex transaction regarding the donation, wherein said donation is not made to the recipient in response to receiving a refusal of the proposed at least one annex operation from the user.

2. The method according to claim 1, further comprising a step of selecting said at least one rule for calculating said at least one parameter of said at least one annex operation from a plurality of different rules.

3. The method according to claim 2, further comprising a step of receiving an identifier of said user interface device, said at least one rule for calculating said at least one parameter of said at least one annex operation being selected from the plurality of different rules according to said identifier of said user interface device.

4. The method according to claim 1, further comprising an initial configuration step of the at least one rule for calculating at least one parameter of at least one annex operation.

5. The method according to claim 1, wherein said merchant computer system, in response to receiving the acceptance of the at least one annex operation, also sends information relative to said main transaction to the annex operation computer management system.

6. The method according to claim 1, further comprising a step of transmitting a print command to said user interface device for printing a receipt comprising said at least one parameter of the proposed at least one annex operation and the at least one received item of information.

7. The method according to claim 6 wherein said print command also prints a reference to an identifier of a personal entity on said receipt.

8. The method according to claim 7 wherein said data comprising at least said at least one parameter of said at least one annex operation further comprise said reference.

9. The method according to claim 1 further comprising a step of storing of said at least one parameter of said at least one annex operation.

10. The method according to claim 9 further comprising a step of generating a transaction based on at least one previously stored parameter of at least one annex operation.

11. The method according to claim 9 further comprising a step of generating a summary of annex operations, said summary comprising at least one previously stored parameter of at least one annex operation.

12. The method according to claim 1, further comprising a step of encrypting at least one datum transmitted between said merchant computer system and said annex operation computer management system.

13. The method according to claim 1, wherein the communication network includes the Internet.

14. The method according to claim 1, wherein said main transaction is managed independently of said steps of calculating the at least one parameter and utilizing the at least one parameter.

15. A method for management of a composite transaction using a merchant computer system that includes a user interface device at a merchant location connected to the merchant computer system via a computer network, and an annex operation computer management system located remotely from the merchant location, with the systems communicating with each other over a communication network, said method for providing donations to any of a plurality of different organizations, said method comprising the steps of:

conducting a plurality of annex operations, each one of said annex operations comprising the steps of:

the merchant computer system executing software instructions conducting a main transaction at the merchant location using the user interface device in support of transacting business with a merchant, the merchant computer system executing software instructions establishing a communication interface with the annex operation computer management system over the communication network, the merchant computer system executing software instructions sending transaction information relative to the main transaction over the communication network to the annex operation computer management system, said transaction information including at least one identifier of the user interface device, in response to receiving the transaction information, the annex operation computer management system executing software instructions selecting, based on said identifier, at least one rule related to a donation request from a plurality of predetermined rules related to donation requests, the merchant computer system executing software instructions automatically calculating at least one parameter of the proposed annex operation regarding a donation from the selected at least one rule, said calculating step being performed according to at least one received item of information in said received transaction information, the annex operation computer management system executing software instructions sending information regarding the calculated at least one parameter regarding the donation to the merchant computer system, contemporaneous with conducting the main transaction, executing software instructions on the merchant computer system proposing to a user using the user interface device at least one annex transaction regarding the donation based on the information regarding the calculated at least one parameter, wherein said user interface device is configured to receive an acceptance or refusal of the proposed annex operation regarding the donation from the user, in response to the user interface device receiving an acceptance of the proposed annex operation regarding the donation, the merchant computer system executing software instructions notifying the annex operation computer management system of said acceptance, and in response to receiving the acceptance, said annex operation computer management system executing software instructions utilizing the calculated at least one parameter to document said annex transaction regarding the donation;

in response to completing the plurality of annex operations, said annex operation computer management system executing software instructions utilizing documented annex transactions regarding the respective donations to transmit payment instructions including information about the documented annex transactions regarding the donations to said merchant computer system to provide payment of various donations to respective recipients;

in response to receiving said payment instructions from said annex operation computer management system, said merchant computer system executing software instructions to send banking transaction information to a banking computer system that is separate and located remotely from the annex operation computer management system, said payment instructions instructing payment of the donations to respective recipients based on the information about the documented annex operations.

16. The method of claim 15, wherein said main transaction is managed independently of said steps of calculating the at least one parameter and utilizing the at least one parameter.

17. The method according to claim 15, further comprising an initial configuration step for configuring one or more rules for providing the plurality of predetermined rules.

18. The method according to claim 17, wherein said configuration step includes a definition of one or more rules associated with one or more payment terminals provided as part of the merchant computer system.

19. The method of claim 1, further comprising the steps of:
the merchant computer system executing software instructions to establish a communication interface with a remotely located banking computer system over a bank intermediation communication network; and
the merchant computer system executing software instructions to send banking transaction information based on the main transaction over the communication network to the banking computer system to establish payment to the merchant.

20. A method for management of a composite transaction using a merchant computer system that includes a user interface device at a merchant location connected to the merchant computer system via a computer network, and an annex operation computer management system located remotely from the merchant location, with the systems communicating with each other over a communication network, said method for providing donations to any of a plurality of different organizations, said method comprising the steps of:
the merchant computer system executing software instructions conducting a main transaction at the merchant location using the user interface device in support of transacting business with a merchant;
the merchant computer system executing software instructions establishing a communication interface with the annex operation computer management system over the communication network;
the merchant computer system executing software instructions sending transaction information relative to the main transaction over the communication network to the annex operation computer management system;
in response to receiving the transaction information, executing software instructions on the annex operation computer management system automatically calculating at least one parameter of a proposed annex operation from at least one predetermined rule related to a donation request, said calculating step being performed according to at least one received item of information in said received transaction information;
executing software instructions on the annex operation computer management system sending information regarding the calculated at least one parameter to the merchant computer system;
contemporaneous with conducting the main transaction, executing software instructions on the merchant computer system proposing to a user using the user interface device at least one annex transaction regarding a donation based on the information regarding the calculated at least one parameter, wherein said user interface device is configured to receive an acceptance or refusal of the proposed at least one annex operation regarding the donation from the user;
in response to the user interface device receiving an acceptance of the proposed at least one annex operation, the merchant computer system executing software instructions notifying the annex operation computer management system of said acceptance;
in response to receiving the acceptance, said annex operation computer management system executing software instructions utilizing the calculated at least one parameter to document said annex transaction regarding the donation;
the merchant computer system executing software instructions to establish a communication interface with a remotely located banking computer system over a bank intermediation communication network; and
the merchant computer system executing software instructions to send banking transaction information based on the main transaction over the communication network to the banking computer system to establish payment to the merchant;
in response to receiving an acceptance of the proposed at least one annex operation from the user, said annex operation computer management system executing software instructions utilizing the documented annex transaction regarding the donation to transmit payment instructions including information about the documented annex transaction regarding the donation to said merchant computer system to provide payment of a donation to a recipient;
in response to receiving said payment instructions from said annex operation computer management system, said merchant computer system executing software instructions to send banking transaction information to a banking computer system that is separate and located remotely from the annex operation computer management system, said payment instructions instructing payment of the donation to the recipient based on the based on the information about the documented annex transaction regarding the donation.

* * * * *